United States Patent [19]

Tanaka et al.

[11] 4,412,214
[45] Oct. 25, 1983

[54] LIQUID CRYSTAL DISPLAY ELEMENT HAVING NON-DISPLAY ELECTRODE ARRANGEMENT

[75] Inventors: Hironari Tanaka; Tadashi Ishibashi; Masaharu Koyama, all of Mobara, Japan

[73] Assignee: Hitachi, Ltd., Tokyo, Japan

[21] Appl. No.: 273,036

[22] Filed: Jun. 12, 1981

[30] Foreign Application Priority Data

Jun. 16, 1980 [JP] Japan .................................. 55-80204

[51] Int. Cl.³ .............................................. G09G 3/36
[52] U.S. Cl. ...................................... 340/765; 340/784
[58] Field of Search ............... 340/765, 784, 763, 783; 350/330, 331, 332, 333

[56] References Cited

U.S. PATENT DOCUMENTS 4,212,011  7/1980  Waldron ............................ 340/784
4,241,344  12/1980  Kmetz et al. ...................... 340/765
4,277,786  7/1981  Waldron ............................ 340/765

*Primary Examiner*—Marshall M. Curtis
*Attorney, Agent, or Firm*—Antonelli, Terry & Wands

[57] ABSTRACT

A liquid crystal display element includes a pattern display section defined by the superposing portions of upper and lower display electrodes. In a non-display area around the display section, upper and lower non-display electrodes are arranged so that the superposing portion thereof partially or entirely covers the non-display area. In operation, a non-selective voltage is always applied across a liquid crystal at the superposing portion of the upper and lower non-display electrodes.

11 Claims, 17 Drawing Figures

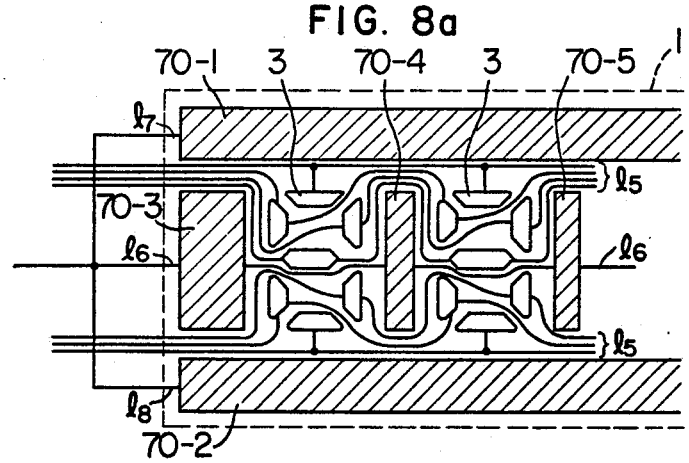
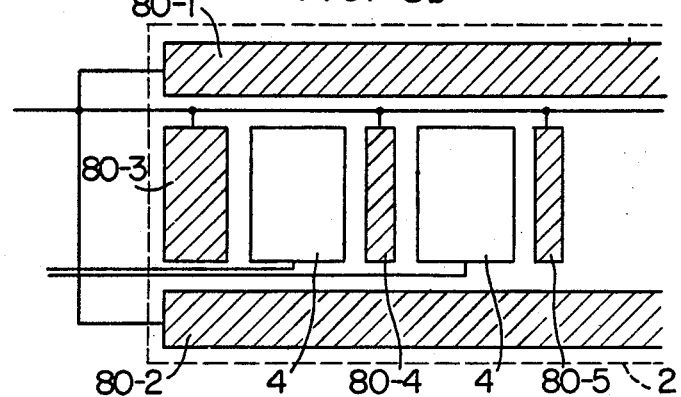
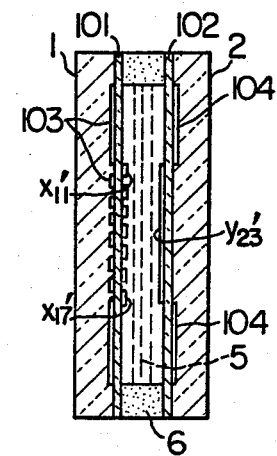
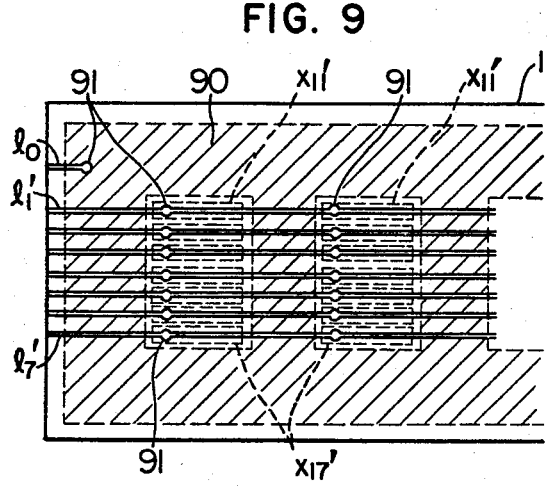
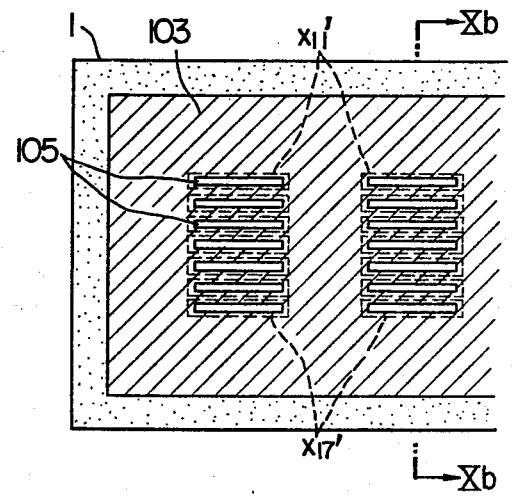

LIQUID CRYSTAL DISPLAY ELEMENT HAVING NON-DISPLAY ELECTRODE ARRANGEMENT

BACKGROUND OF THE INVENTION

1. Field of the Invention

The present invention relates to a liquid crystal display element and more particularly to the electrode arrangement in such an element capable of improving the legibility or recognizability of a displayed pattern.

2. Description of the Prior Art

FIGS. 1a and 1b show the plan and sectional views of the main part of a typical prior art 7-segment type numeric liquid crystal display element. In the figures, numerals 1 and 2 designate opposite upper and lower substrates of transparent glass plates, numeral 3 designates seven transparent segment electrodes disposed on the inner surface of the upper substrate 1 to provide a form of numeral "8" as a whole which can selectively produce figures 0 to 9, and numeral 4 designates a transparent common electrode disposed on the inner surface of the lower substrate 2 opposite to the seven segment electrodes 3. The seven segment electrodes 3 and the one common electrode 4 opposite thereto constitute one pattern display section. A liquid crystal 5 is sandwiched between the upper and lower substrates 1 and 2 distanced by a predetermined interval and supported by a sealing material 6. In the illustration are omitted polarizers which may be disposed at the both sides of the paired substrates 1 and 2 respectively. A reflector used in the case of a reflection type display mode is also omitted.

With the thus constructed display element, a predetermined voltage is selectively applied between the segment and common electrodes 3 and 4 to change the optical characteristic of the liquid crystal at the superposing portion of these electrodes 3 and 4. This change of the optical characteristic is observed from the front side or upper substrate side of the display element. In FIG. 1a, dark patterns of figures "2" and "4" are shown to be displayed in a bright or light background. Such a display is made, for example, when crossed polarizers are arranged before and after the display element in the case where a 90° twisted nematic liquid crystal is used.

Now, the display plane of the display element shown in FIG. 1a includes portions A of selected segment electrodes 3, portions B of non-selected segment electrodes 3, a region D having no segment electrode 3 within the display section, and a non-display area including regions C1 between the adjacent display sections and a region C2 outside of a set of the display sections. In operation, a selective voltage capable of exciting the liquid crystal is applied across the liquid crystal at the selected portions A while a non-selective voltage selected to be lower than the selective voltage is applied across the liquid crystal at the non-selected portions B. In a static or dynamic drive, it is possible to drive the display element without exciting the liquid crystal at the non-selected portions B, in a low multiplex driving range (for example, having a duty ratio up to $\frac{1}{4}$). In a high multiplex driving fashion (for example, having a duty ratio smaller than $\frac{1}{4}$), however, the applied non-selective voltage would cause the excitation of the liquid crystal at the portions B so that those portions have somewhat dark appearance, which renders the recognition of the display pattern of the dark portions A difficult. Namely, the display pattern of the portions is difficult to recognize since the area of the bright regions C1, C2 and D is large compared with that of the dark portions A and in addition to portions B become somewhat dark. This difficulty in recognition of the displayed pattern is due to the fact that one level must be recognized among three different and bright levels.

FIGS. 2a and 2b show the plan and sectional views of the main part of a typical prior art dot type alphanumeric liquid crystal display element. In the figures, the same or like numerals and symbols are provided to the same or like components and portions as FIGS. 1a and 1b. In the example shown in FIG. 2a, one pattern display section is constructed by a matrix of 7×5 dots. Seven transparent x stripe electrodes 13 extend on the inner surface of the upper substrate 1 in the longitudinal direction thereof while a predetermined number (five per one display section) of transparent y stripe electrodes 14 extend on the inner surface of the lower substrate 2 in the transverse direction thereof. In FIG. 2a, each of the superposing or intersection portions of the x and y stripe electrodes 13 and 14 is shown to have a square form.

In the dot type display element shown in FIG. 2a, the recognizability of display pattern gets somewhat better since the area of a bright region D' having no insersection portions of the x and y stripe electrodes within the display section is smaller than that of the similar region D in the 7-segment type display element shown in FIG. 1a. However, the existence of bright regions C1' and C2' between the adjacent display sections and around the display section set still renders to recognition of the display pattern of the dark portions A' difficult.

The problem of the above-described difficulty in recognition of the displayed pattern holds also for the case where a bright pattern is displayed in a dark background.

SUMMARY OF THE INVENTION

An object of the present invention is to provide a liquid crystal display element in which a displayed pattern is easily recognizable.

To that end, the liquid crystal display element according to the present invention comprises upper and lower display electrodes in a pattern display section as well as upper and lower non-display electrodes in a non-display area around the display section, the upper and lower non-display electrodes being adapted to be always applied therebetween with a non-selective voltage lower than a selective voltage capable of exciting the liquid crystal.

In certain embodiments, the upper and lower non-display electrodes are configured to partially cover the non-display area.

In further embodiments, the upper and lower non-display electrodes are configured to substantially cover the entire non-display area.

In still further embodiments, the upper and lower non-display electrodes are also configured to cover those portion of the display section excepting the superposing portion of the upper and lower display electrodes.

BRIEF DESCRIPTION OF THE DRAWINGS

FIGS. 1a and 1b show a typical prior art 7-segment type liquid crystal display element, FIG. 1a being a plan view of the display element and FIG. 1b being a sectional view taken along line Ib—Ib of FIG. 1a;

FIGS. 2a and 2b show a typical prior art dot type liquid crystal display element, FIG. 2a being a plan view of the display element and FIG. 2b being a sectional view taken along line IIb—IIb of FIG. 2a;

FIGS. 3a and 3b show one example of a dot type liquid crystal display element according to the present invention, FIG. 3a being a plan view of the display element and FIG. 3b being a sectional view taken along line IIIb—IIIb of FIG. 3a;

FIGS. 4a and 4b show one example of a 7-segment type liquid crystal display element according to the present invention, FIG. 4a being a plan view of the display element and FIG. 4b being a sectional view taken along line IVb—IVb of FIG. 4a;

FIGS. 8a and 8b show one embodiment of the 7-segment type liquid crystal display element, FIG. 8a illustrating the layout of electrodes at the side of an upper substrate and FIG. 8b illustrating the electrode layout at the side of a lower substrate;

FIG. 9 illustrates the layout of electrodes at the side of an upper substrate in a further embodiment of the dot type liquid crystal display element; and FIGS. 10a and 10b show a still further embodiment of the dot type liquid crystal display element, FIG. 10a illustrating the layout of electrodes at the side of an upper substrate and FIG. 10b illustrating a sectional view of the display element.

DESCRIPTION OF THE PREFERRED EMBODIMENTS

The present invention will now be explained in detail by use of its embodiments with reference to FIGS. 3 to 10.

Figure 2A:
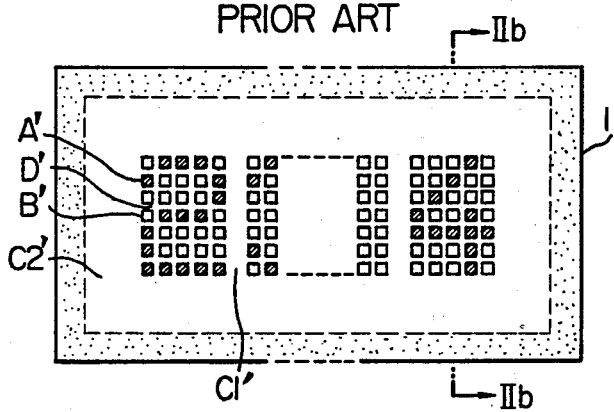
Figure 2B:
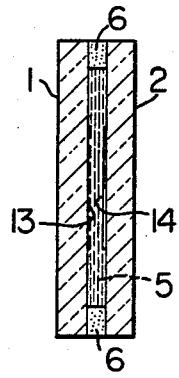
Figure 3A:
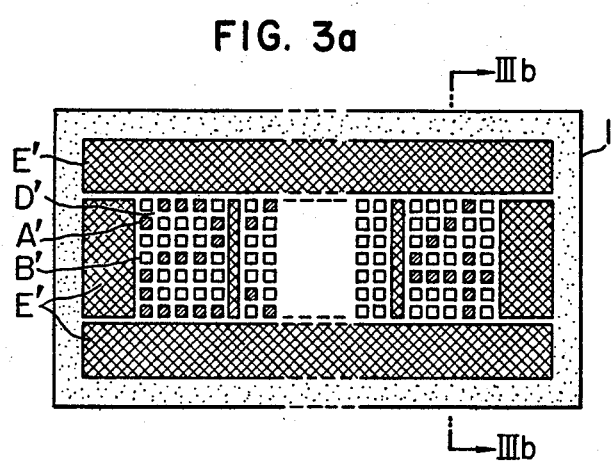
Figure 3B:
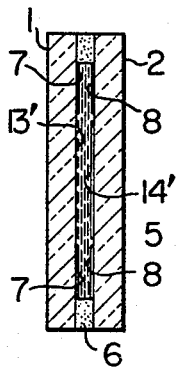

Referring to FIGS. 3a and 3b illustrating plan and sectional views for explaining one example of the dot type liquid crystal display element according to the present invention, the same or like numerals and symbols are provided at the same or like components and portions as FIGS. 2a and 2b. As shown, additional upper and lower electrodes (non-display electrodes) 7 and 8 of transparent conductor films having superposing portions E' are arranged opposite to each other on the inner surface of the upper and lower substrates 1 and 2 respectively in a non-display area around the display sections which include the square superposing or intersection portions A' (applied with a selective voltage in the shown example) and B' (applied with a non-selective voltage) of x and y stripe electrodes (display electrodes) 13' and 14'.

According to the principle of the present invention, square superposing portions of the x and y stripe electrodes 13' and 14' constituting the display section are selectively applied with a selective voltage capable of exciting the liquid crystal and a non-selective voltage lower than the selective voltage in accordance with a desired pattern to be displayed while the superposing portions E' of the non-display electrodes 7 and 8 are always applied with the non-selective voltage. In the shown example, the selective voltage is applied across the liquid crystal at the squares A' and the non-selective voltage is applied across the liquid crystal at the squares B'. As a result, the display pattern of the selected portions A' can be instantaneously recognized even if the non-selective voltage causes the excitation of the liquid crystal at the non-selected portions B'. In the case of the conventional structure shown in FIG. 2a, the display pattern of portions A' is difficult to recognize since the display plane is mainly constructed by areas of three bright and dark levels including dark portions A' excited by the selective voltage, somewhat dark (or bright) portions B' slightly or lightly excited by the non-selective voltage and bright regions C1', C2' having no applied voltage thereacross and the area of bright regions C1 and C2 is larger compared with that of dark portions A'. In FIG. 3a, since the display plane is substantially constructed by areas of two bright and dark levels including dark portions A' and somewhat bright regions B' and E' and bright portions are only D', the display pattern of portions A' becomes very recognizable.

Figure 1A:
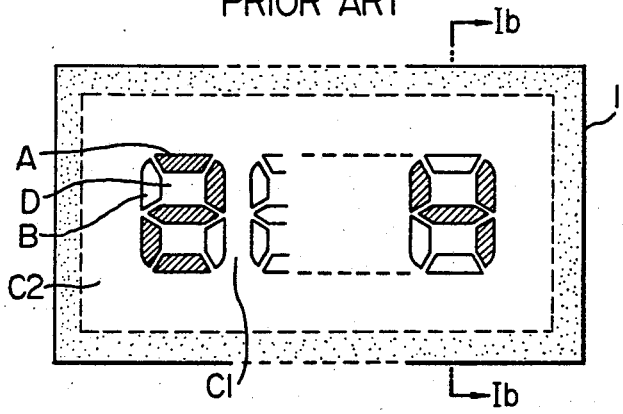
Figure 1B:
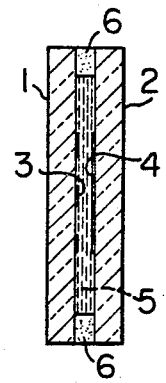
Figure 4A:
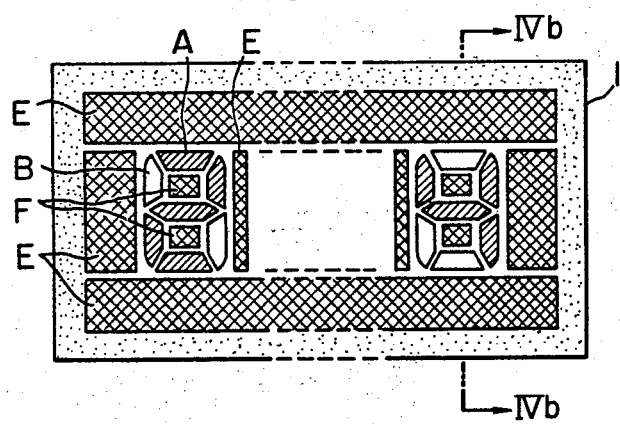
Figure 4B:
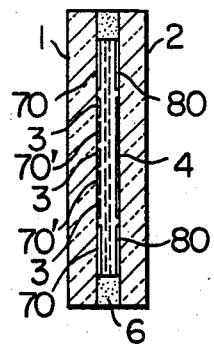

FIGS. 4a and 4b show plan and sectional views for explaining one example of the 7-segment type liquid crystal display element according to the present invention. In the figures, the same or like numerals and symbols are provided to the same or like components and portions as FIGS. 1a and 1b. As shown, additional upper and lower electrodes (non-display electrodes) 70 and 80 of transparent conductor films having superposing portions E are formed opposite to each other on the inner surface of the upper and lower substrates 1 and 2 respectively in a background non-display area around the display sections which include the superposing portions A and B of the segment and common electrodes (display electrodes) 3 and 4. In the shown example, additional electrodes (non-display electrodes) 70' are preferably formed on the inner surface of the upper substrate 1 in regions F corresponding to the region D of FIG. 1a. According to the principle of the present invention, selective and non-selective voltages are selectively applied across the liquid crystal at the portions A and B in accordance with a desired pattern to be displayed while the non-selective voltage is always applied across the liquid crystal at the regions E (and regions F).

It should be noted that the configuration of the regions E' (or E) shown in FIG. 3a (or FIG. 4a) and the corresponding configuration of the additional or non-display electrodes 7 and 8 (or 70 and 80) shown in FIG. 3b (or FIG. 4b) are examples and various configurations can be employed as will be described infra. In the present invention, it is essential that the upper and lower non-display electrodes 7 and 8 (or 70 and 80) are arranged so that the superposing portions thereof cover, as much as possible, a non-display area defined by an area around the display sections which includes first regions at opposite first sides of the set of display sections in the longitudinal directions of the upper and lower substrates 1 and 2, second regions at opposite second sides of the display section set in the transverse directions of the upper and lower substrates and third regions between the adjacent display sections.

Figure 5:
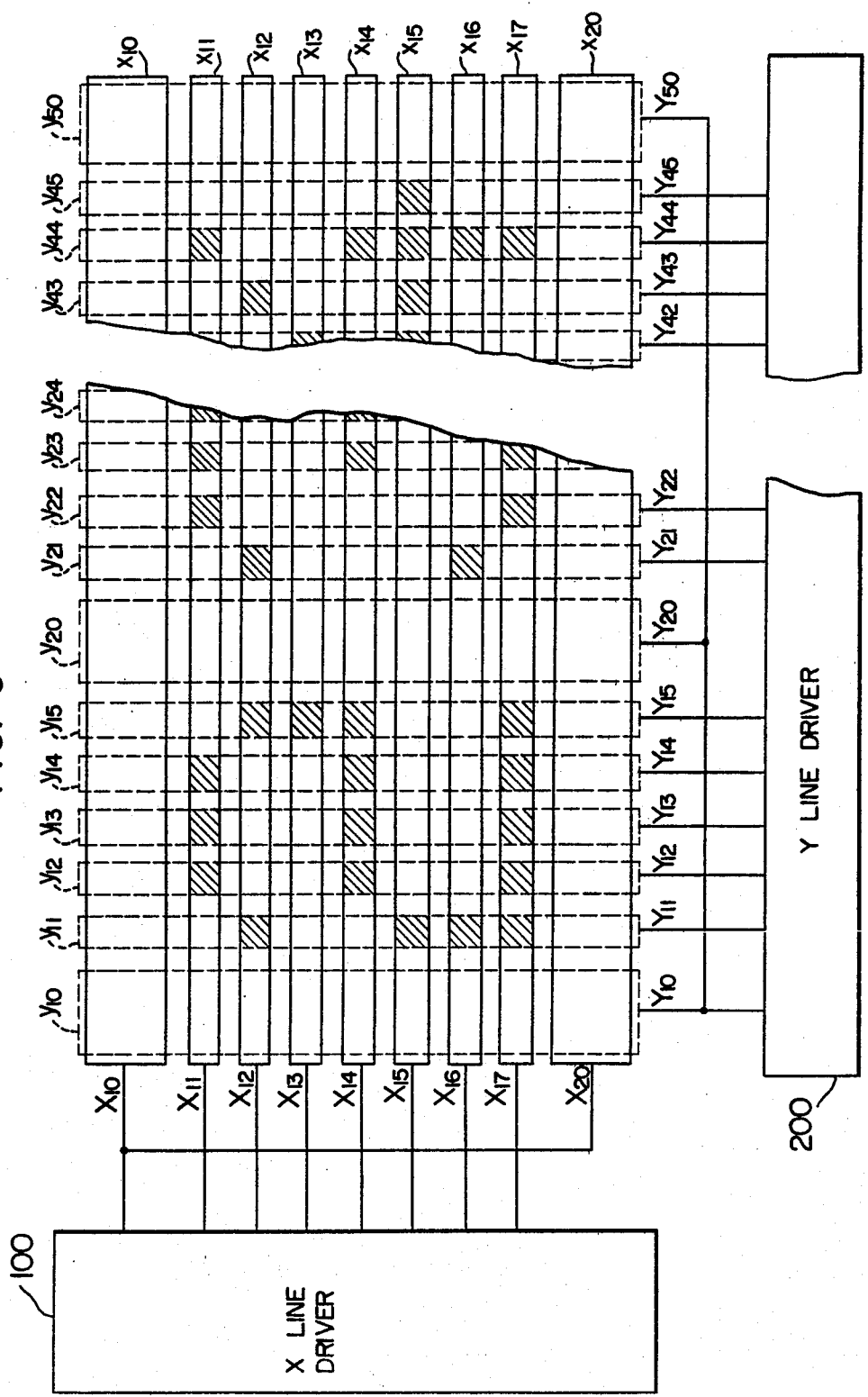
FIG. 5 illustrates the electrode arrangement according to one embodiment of the dot type liquid crystal display element together with its driving circuit.

FIG. 5 shows one embodiment of a concrete electrode arrangement for forming a display plane as shown in FIG. 3a, together with its driving circuit. The illustration is a four-digit display in which each display section includes a matrix of 5×7 dots. On the inner surface of the upper substrate 1 in the longitudinal direction thereof are arranged conventional x stripe electrodes $x_{11}$–$x_{17}$ adapted to be connected to scanning lines $X_{11}$–$X_{17}$ and additional x stripe electrodes $x_{10}$ and $x_{20}$ according to the present invention adapted to be connected to scanning lines $x_{10}$ and $x_{20}$. On the inner surface of the lower substrate 2 in the transverse direction thereof, on the other hand, are arranged conventional y stripe electrodes $y_{11}$–$y_{15}$, . . . , $y_{41}$–$y_{45}$ adapted to be connected to signal lines $Y_{11}$–$Y_{15}$, . . . , $Y_{41}$–$Y_{45}$ and additional y stripe electrodes $y_{10}$, $y_{20}$, . . . , $y_{50}$ according to the present invention adapted to be connected to signal lines $Y_{10}$, $Y_{20}$, . . . , $Y_{50}$. The X scanning lines are connected to an X line driver 100 and the Y signal lines are connected to a Y line driver 200. In the embodiment shown in FIG. 5, the upper non-display electrode arrangement includes the x stripe electrodes $x_{10}$, $x_{20}$ and those portions of the x stripe electrodes $x_{11}$–$x_{17}$ existing at the non-display area while the lower non-display arrangement includes the y stripe electrodes $y_{10}$, $y_{20}$, . . . , $y_{50}$ and those portions of the y stripe electrodes $y_{1-1}$–$y_{15}$, . . . , $y_{41}$–$y_{45}$.

Figure 6:
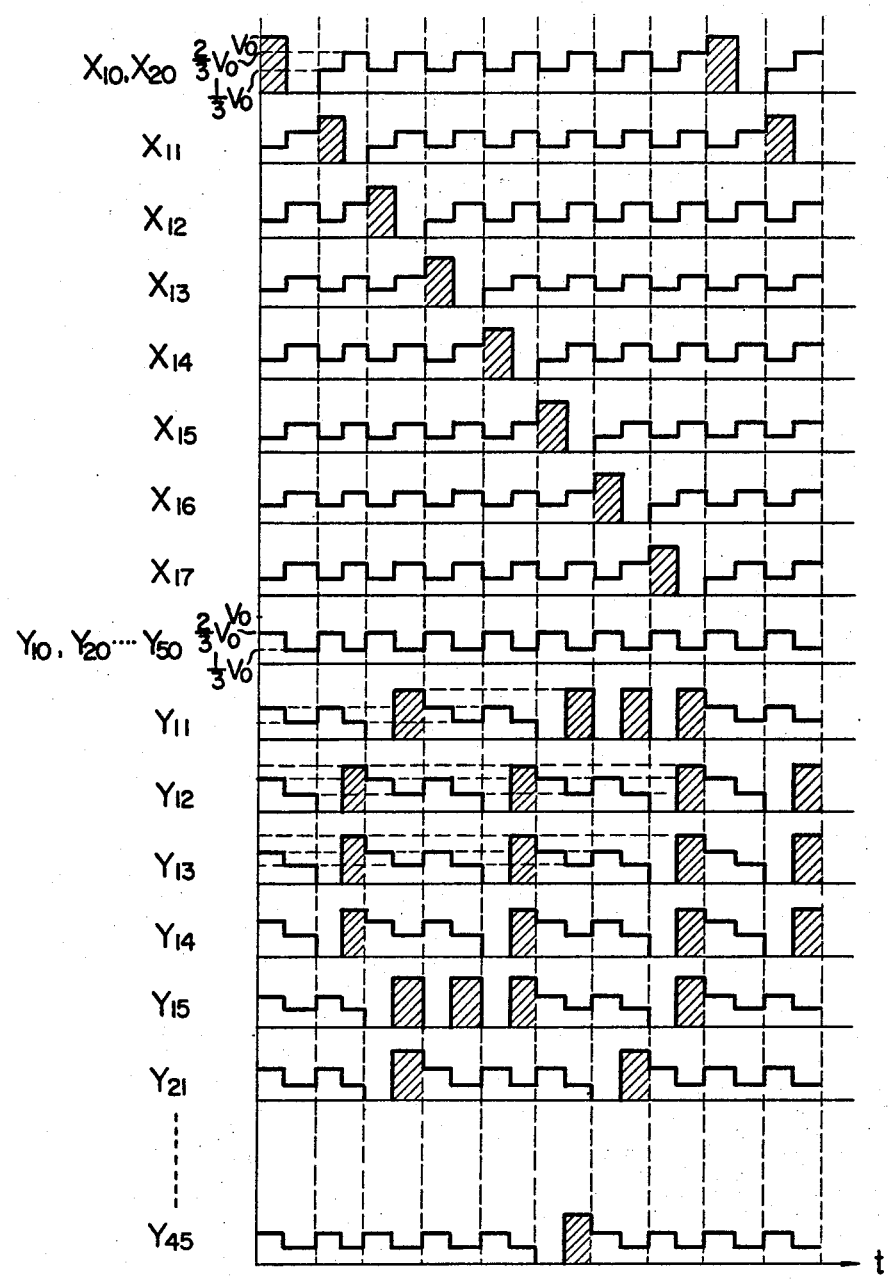
FIG. 6 illustrates the time chart of one example of driving voltage waveforms used for the embodiment of FIG. 5.

The time chart of an example of voltage waveforms applied to the X scanning and Y signal lines when it is desired to display a figure "2" at the first digit section in the electrode arrangement of FIG. 5 is shown in FIG. 6. For the purpose of the present invention, the scanning lines $X_{10}$ and $X_{20}$ connected to the additional x electrodes $x_{10}$ and $x_{20}$ are commonly coupled while the signal lines $Y_{10}$, $Y_{20}$, . . . , $Y_{50}$ connected to the additional y electrodes $y_{10}$, $y_{20}$, . . . , $y_{50}$ are commonly coupled. From FIG. 6, it is seen that at the intersection portions of the x and y electrodes where a display is desired (selected points), a voltage of $V_o$ and 0 volts is applied to the x electrode and a voltage of 0 and $V_o$ volts (selective voltage) in applied to the y electrode so that a differential voltage of $V_o$ and $-V_o$ volts is developed across the liquid crystal at the selected points. It should be understood that a voltage of $\frac{1}{3} V_o$ and $-\frac{1}{3} V_o$ volts (non-selective voltage) is developed across at the liquid crystal at all the other intersection portions including portions at which either one of x or y electrode is selected and regions at which neither x nor y electrode is selected. In FIG. 6, it should be noted that a voltage of $\frac{2}{3} V_o$ and $\frac{1}{3} V_o$ volts is always applied to the signal lines $Y_{10}$, $Y_{20}$, . . . , $Y_{50}$ connected to the additional y electrodes $y_{10}$, $y_{20}$, . . . , $y_{50}$ and a voltage of $\frac{2}{3} V_o$ and $\frac{1}{3} V_o$ volts applied to all the y electrodes when the additional x electrodes $x_{10}$ and $x_{20}$ are selected, so that the non-selective voltage is always developed across the liquid crystal at all the intersection portions in the non-display area of FIG. 5.

A circuit implementation for obtaining the voltage waveforms in the driving manner shown in FIG. 6, called voltage averaging method, is well known. For example, one can refer to FIG. 7 of U.S. Pat. No. 3,975,726 to Kawakami. Instead the driving voltage waveforms shown in FIG. 6, there can be used voltage waveforms shown in U.S. Pat. Nos. 3,976,362, 3,995,942 and 3,877,017 to Kawakami.

Figure 7A:
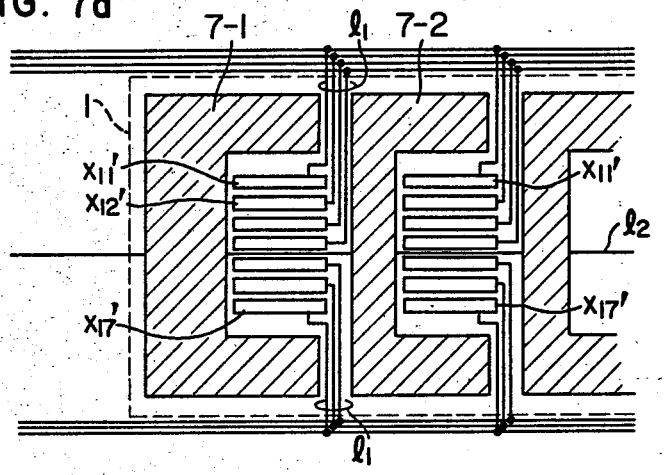
FIGS. 7a and 7b show another embodiment of the dot type liquid crystal display element, FIG. 7a illustrating the layout of electrodes at the side of an upper substrate and FIG. 7b illustrating the electrode layout at the side of a lower substrate.
Figure 7B:
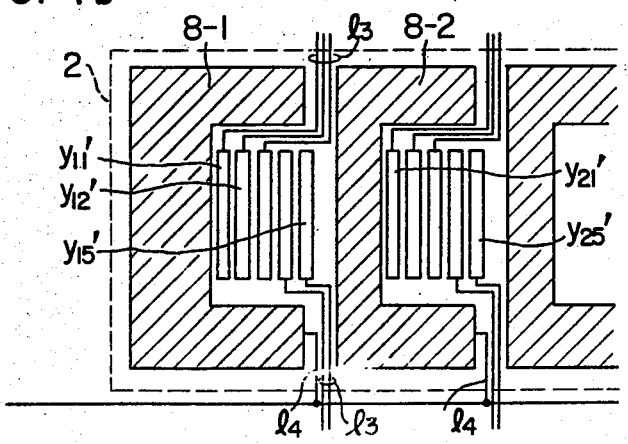

FIGS. 7a and 7b show another embodiment of a concrete electrode arrangement for providing a display plane as shown in FIG. 3a. FIG. 7a illustrates the layout of electrodes disposed on the inner surface of the upper substrate 1 and FIG. 7b illustrates the layout of electrodes disposed on the inner surface of the lower substrate 2. In the present embodiment, unlike the FIG. 5 embodiment, x stripe electrodes $x'_{11}$–$x'_{17}$ are formed on the upper substrate 1 for every display section and within the associated display section and lead wires $l_1$ connected to those electrodes are drawn out towards the ends of the upper substrate. The lead wires of the corresponding x stripe electrodes in the respective display sections are adapted to be commonly coupled in the exterior. In a non-dispaly area, upper non-display electrode 7-1, 7-2, . . . according to the present invention are formed with a lead wire $l_2$ interconnecting therebetween. The lead wires $l_1$ of the x stripe electrodes $x'_{11}$–$x'_{17}$ extend between the adjacent non-display electrodes. On the lower substrate 2, y stripe electrodes $y'_{11}$–$y'_{15}$, $y'_{21}$–$y'_{25}$, . . . are formed in the respective display sections and lower non-display electrodes 8-1, 8-2, . . . are formed, in the non-display area, opposite to the upper non-display electrodes 7-1, 7-2, . . . . Lead wires $l_3$ of the y stripe electrodes are drawn out through a spacing between the adjacent lower non-display electrodes to the ends of the lower substrate. Lead wires $l_4$ from the non-display electrodes 8-1, 8-2, . . . are adapted to be commonly coupled at the exterior. Typically, the width of each of the x and y stripe electrodes is about 0.5 mm and the width of each lead wire is about 0.1 mm. It will be understood that the superposing portions of the upper and lower non-display electrode arrangements in the present embodiment cover the non-display area more than those in the FIG. 5 embodiment.

FIGS. 8a and 8b show one embodiment of a concrete electrode arrangement for forming a display plane as shown in FIG. 4a. FIG. 8a illustrates the layout of electrodes disposed on the inner surface of the upper substrate 1 and FIG. 8b illustrates the layout of electrodes disposed on the inner surface of the lower substrate 2. Each display section includes seven segment electrodes 3 formed on the upper substrate 1 and one common electrode 4 formed on the lower substrate 2. Around the display sections, non-display electrodes 70-1, 70-2, 70-3, . . . and non-display electrodes 80-1, 80-2, 80-3, . . . are formed opposite to each other on the upper and lower substrates 1 and 2 respectively. The corresponding segment electrodes 3 in the respective display sections are interconnected through lead wires $l_5$ passed between the upper non-display electrodes 70-1, 70-2 and the upper non-display electrodes 70-3, 70-4, . . . and the lead wires $l_5$ are drawn out towards one end of the upper substrate. The upper non-display electrodes 70-3, 70-4, . . . are interconnected in the upper substrate through a lead wire $l_6$ which is in turn adapted to be coupled with lead wires $l_7$ and $l_8$ of the upper non-display electrodes 70-1 and 70-2 at the exterior. The arrangement of lead wires of the respective electrodes on the lower substrate 2 will be apparent from FIG. 8b.

It is of course apparent that the display elements according to the embodiment of FIGS. 7a and 7b and the embodiments of FIGS. 8a and 8b can be driven by the voltage waveforms explained in conjunction with FIG. 6.

FIG. 9 shows the layout of electrodes at the side of the upper substrate 1 in a further embodiment of a concrete electrode arrangement for providing a display plane as shown in FIG. 3a. In the present embodiment, x stripe electrodes $x'_{11}$–$x'_{17}$ covering each display section and a continuous non-display electrode 90 covering the entire non-display area are formed on the inner surface of the upper substrate 1. On the outer surface of the upper substrate 1, on the other hand, are provided extensions of lead wires $l_0$ and $l'_1$–$l'_7$ which are connected to the electrodes 90 and x'₁₁-x'₁₇ via throughholes 91 passed through the upper substrate. A similar electrode layout is applied to the lower substrate. In the present embodiment, the separate provision of the electrodes and the lead wires on the inner and outer surfaces of each substrate allows the coverage of the entire non-display area by the non-display electrode so that the effect of the present invention can be exhibited at maximum. It is of course apparent that the present embodiment is also applicable to the 7-segment type display element.

FIGS. 10a and 10b show the layout of electrodes at the side of the upper substrate 1 and a sectional view of the display element in a still further embodiment of a concrete electrode arrangement for providing a display plane as shown in FIG. 3a. In accordance with the present embodiment, transparent thin insulating layers 101 and 102 are provided on the inner surfaces of the upper and lower substrates 1 and 2 respectively. Stripe display electrodes x'₁₁-x'₁₇ and a continuous non-display electrode 103 are formed on opposite sides of the insulating layer 101 respectively while y stripe display electrodes and a continuous non-display electrode 104 are formed on opposite sides of the insulating layer 102. A lead wire of each electrode is drawn out toward the end of the substrate on the insulating layer side having that electrode. As seen in FIG. 10a, the continuous non-display electrode 103 has blanks 105 corresponding to the x stripe electrodes x'₁₁-x'₁₇. Preferably, the area of each blank 105 is slightly smaller than the corresponding x stripe electrode. This also holds for the continuous non-display electrode 104. In accordance with the present embodiment, it is possible to develop a non-selective voltage across the liquid crystal at substantially all the portions of the display section except for the intersections of the x and y stripe electrodes as well as across the liquid crystal at the non-display area. As a result, the recognizability of a display pattern is remarkably improved.

The preceding embodiments are given for the purpose of exemplifications and hence the present invention is never limited to these embodiments. Each embodiment has been explained in conjunction with a numeric or alpha-numeric display element but the present invention is also applicable to a liquid crystal display element performing any other display such as graphic display. The effect of the present invention is equally obtained in either case of dark appearance (positive image) or bright appearance (negative image) of a display pattern. A liquid crystal used is not limited to a twisted nematic type but one can use a liquid crystal based on any known display principle. The upper and lower substrates have been explained to be both transparent. However, in the case of a reflection mode of display and when a reflector is provided at the inside of one of the substrates, the one substrate may be opaque.

We claim:

1. A liquid crystal display element comprising:
 (a) opposite upper and lower substrates having a longitudinal direction and a direction transverse thereto;
 (b) a liquid crystal sandwiched between inner surfaces of said upper and lower substrates;
 (c) a set of plural separated and adjacent pattern display sections, each of said display sections having a first upper electrode arrangement including a plurality of electrodes and a first lower electrode arrangement including at least one electrode, said first upper electrode arrangement being disposed on the inner surface of said upper substrate and said first lower electrode arrangement being disposed on the inner surface of said lower substrate, said first upper and lower electrode arrangement being configured so that superposing portions thereof selectively provide a plurality of predetermined display patterns, said first upper and lower electrode arrangements being adapted to be selectively applied therebetween with a selective voltage which excites the liquid crystal and a non-selective voltage which is lower than said selective voltage;
 (d) a background non-display area delimited by an area around said display sections, said background non-display area including first regions at opposite first sides of said set of display sections in the longitudinal direction of each of said upper and lower substrates, second regions at opposite second sides of said set of display sections in the transverse direction of each of said upper and lower substrates, and third regions between the adjacent display sections, a second upper electrode arrangement disposed on the inner surface of said upper substrate in said background non-display area, a second lower electrode arrangement disposed on the inner surface of said lower substrate in said background non-display area, said second upper and lower electrode arrangements having superposing portions thereof at least partially covering said background non-display area, said second upper and lower electrode arrangements being adapted to be always applied therebetween with said non-selective voltage, at least the portions of said second upper electrode arrangement disposed in said second region of said background non-display area being electrically interconnected with each other and electrically isolated from said first upper electrode arrangement, and at least the portions of said second lower electrode arrangement disposed in said first and third regions of said background non-display area being electrically interconnected with each other and electrically isolated from said first lower electrode arrangement; and
 (e) the voltage applying means for selectively applying said selective and non-selective voltages between said first upper and lower electrode arrangements in accordance with a pattern to be displayed and for always applying said non-selective voltage between said second upper and lower electrode arrangements irrespective of the pattern to be displayed.

2. A liquid crystal display element according to claim 1, wherein said first upper electrode arrangement includes a predetermined number of first longitudinal stripe electrodes extending on the inner surface of said upper substrate in the longitudinal direction thereof to said first and third regions of said background non-display area and commonly over said display sections, said first lower electrode arrangement includes a predetermined number of first transverse stripe electrodes extending on the inner surface of said lower substrate in the transverse direction thereof to said second regions of said background non-display area, said second upper electrode arrangement includes second longitudinal stripe electrodes electrically interconnected with each other and electrically isolated from said first longitudinal stripe electrodes, said second longitudinal stripe electrodes extending on the inner surface of said upper substrate in the longitudinal direction thereof at said second regions of said background non-display area and at the portions of said first longitudinal stripe electrodes disposed at said first and third regions of said background non-display area, and said second lower electrode arrangement includes second transverse stripe electrodes electrically interconnected with each other and electrically isolated from said first transverse stripe electrodes, said second transverse stripe electrodes extending on the inner surface of said lower substrate in the transverse direction thereof at said first and third regions of said background non-display area and at the portions of said first transverse stripe electrodes disposed at said second regions of said background non-display area.

3. A liquid crystal display element according to claim 1, wherein said first upper electrode arrangement includes a predetermined number of longitudinal stripe electrodes extending on the inner surface of said upper substrate in the longitudinal direction thereof within said display section and said first lower electrode arrangement includes a predetermined number of transverse stripe electrodes extending on the inner surface of said lower substrate in the transverse direction thereof within said display section.

4. A liquid crystal display element according to claim 1, wherein said first upper electrode arrangement includes seven segment electrodes disposed on the inner surface of said upper substrate to provide a form of numeral "8", and said first lower electrode arrangement includes a common electrode disposed on the inner surface of said lower substrate opposite to said seven segment electrodes.

5. A liquid crystal display element according to claim 4, wherein third upper electrodes electrically isolated from said seven segment electrodes are respectively arranged on the inner surface of said upper substrate in two regions enclosed by said seven segment electrodes, said third upper electrodes and said common electrode being adapted to be always applied therebetween with said non-selective voltage by said voltage applying means.

6. A liquid crystal display element according to claim 1, wherein each of said second upper and lower electrode arrangements includes a single electrode to entirely cover said background non-display area.

7. A liquid crystal display element according to claim 6, wherein the outer surface of said upper substrate has thereon lead means respectively connected to said first and second upper electrode arrangements via through-hole means passed through said upper substrate, and the outer surface of said lower substrate has thereon lead means respectively connected to said first and second lower electrode arrangements via through-hole means passed through said lower substrate.

8. A liquid crystal display element according to claim 6, wherein a third upper electrode arrangement contiguous to said second upper electrode arrangement is disposed on the inner surface of said upper substrate within said display section and between the electrodes of said first upper electrode arrangement.

9. A liquid crystal display element according to claim 8, wherein a third lower electrode arrangement contiguous to said second lower electrode arrangement is disposed on the inner surface of said lower substrate within said display section and between the electrodes of said first lower electrode arrangement.

10. A liquid crystal display element according to claim 9, wherein the inner surface of said upper substrate includes an insulating layer having a first surface on which said second and third upper electrode arrangements are disposed and a second surface on which said first upper electrode arrangement is disposed, and the inner surface of said lower substrate includes an insulating layer having a first surface on which said second and third lower electrode arrangements are disposed and a second surface on which said first lower electrode arrangement is disposed.

11. A liquid crystal display element comprising:
opposite upper and lower substrates having therebetween a pattern display section and a background non-display area around said display section;
a layer of liquid crystal sandwiched between inner surfaces of said upper and lower substrates;
upper and lower display electrodes disposed on the respective inner surfaces of said upper and lower substrates in said display section, said upper and lower display electrodes being configured so that superposing portions thereof selectively provide a plurality of predetermined display patterns, said upper and lower display electrodes being adapted to be selectively applied therebetween with a selective voltage which excites the liquid crystal and a non-selective voltage which is lower than said selective voltage;
first upper and lower non-display electrodes arranged on the respective inner surfaces of said upper and lower substrates in said background non-display area, said first upper and lower non-display electrodes being adapted to be always applied therebetween with said non-selective voltage, said first upper and lower non-display electrodes being configured so that superposing portions thereof at least partially cover said background non-display area;
second upper and lower non-display electrodes arranged on the respective inner surfaces of said upper and lower substrates in portions of said display section other than superposing portions of said upper and lower display electrodes, said second upper and lower non-display electrodes being adapted to be always applied therebetween with said non-selective voltage; and
voltage applying means for selectively applying said selective and non-selective voltages between said upper and lower display electrodes in accordance with a pattern to be displayed and for always applying said non-selective voltage between said first and second upper and lower non-display electrodes irrespective of the pattern to be displayed.

* * * * *